(12) United States Patent
Garagic et al.

(10) Patent No.: US 12,517,525 B1
(45) Date of Patent: Jan. 6, 2026

(54) PATH CREATION, DETECTION AND PREDICTION USING PRIMITIVES

(71) Applicant: Sarcos Corp., Salt Lake City, UT (US)

(72) Inventors: Denis Garagic, Salt Lake City, UT (US); Fraser M. Smith, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 19/068,901

(22) Filed: Mar. 3, 2025

(51) Int. Cl.
*G05D 1/644* (2024.01)
*G05D 1/246* (2024.01)
*G05D 101/15* (2024.01)
*G05D 101/20* (2024.01)
*G06F 40/40* (2020.01)

(52) U.S. Cl.
CPC ............ *G05D 1/644* (2024.01); *G05D 1/246* (2024.01); *G05D 2101/15* (2024.01); *G05D 2101/20* (2024.01); *G06F 40/40* (2020.01)

(58) Field of Classification Search
CPC .... G05D 1/644; G05D 1/246; G05D 2101/15; G05D 2101/20; G06F 40/40
USPC .......................................................... 382/103
See application file for complete search history.

(56) References Cited

U.S. PATENT DOCUMENTS

2019/0163618 A1* 5/2019 Akiona ................... G06Q 10/06
2023/0022785 A1* 1/2023 Khalife ................... G16H 40/20

FOREIGN PATENT DOCUMENTS

WO  WO-2023034500 A1 *  3/2023 ........... G01S 5/0205
WO  WO-2024233674 A2 * 11/2024 ............. G06Q 10/04

* cited by examiner

*Primary Examiner* — Charlotte M Baker
(74) *Attorney, Agent, or Firm* — Thorpe North & Western, LLP

(57) ABSTRACT

Technology is described for a method for recognition of a target type using primitive patterns. The method can include detecting an activity signature of a target that is moving, using a sensor node. Another operation may be sampling the activity signature of the target to provide sub-samples. The sub-samples may be compared to primitives from a data store of primitives, using machine learning. In addition, the primitives are selected that are similar to the sub-samples and are joinable together to form an activity signature model. The activity signature model can be compared with activity signature templates for targets to determine the target type being captured by the sensor node.

38 Claims, 8 Drawing Sheets

PATH CREATION, DETECTION AND PREDICTION USING PRIMITIVES

BACKGROUND

Robotic systems, such as manufacturing robots, military robots, robotic vehicles and humanoid robots are becoming more robust, powerful and capable. Manufacturing robots, military robots, robotic vehicles and humanoid robots are also becoming more prevalent in practical uses as the technologies, cost effectiveness and efficiencies improve.

Automated military robots are desirable in many military situations. In a military application, robots and other autonomous devices may need to navigate across vast distances and be able determine their location in a theater of combat. Other types of autonomous groups of robots may be used for navigating other large areas such are farms, mining complexes, industrial locations, factories, warehouses and other spread out areas to complete an assigned task. Groups of ground robots or flying robots may also be used to monitor targets in an area of regard (AOR)

DETAILED DESCRIPTION OF THE PREFERRED EMBODIMENTS

Figure 1:
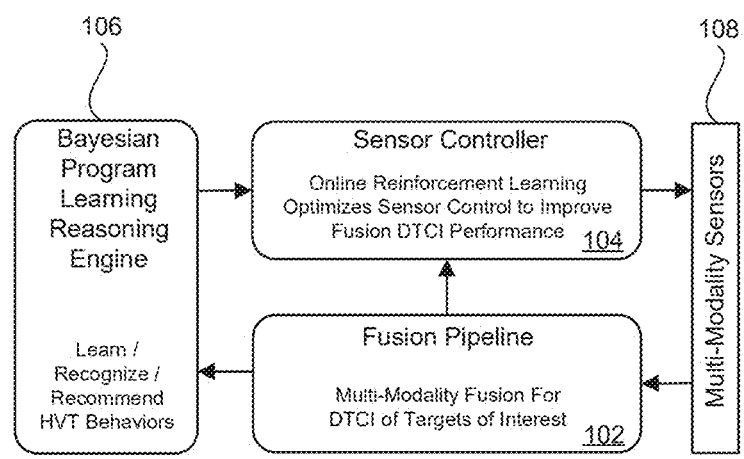
FIG. 1 is a block diagram illustrating an example of a system for performing probabilistic examination of targets using an automated closed-loop for a group of sensor devices.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

This technology may provide methods and systems to autonomously control sensors (and sensor grids (SGs) of sensor nodes) for improved sensor data fusion and use of multiple sensor data streams for improved detection, tracking, classification, and identification (DTCI) to enhance recognition of high value targets (HVTs) in the scene of interest and maintenance of a track stored for priority targets. The system may perform probabilistic examination of complex targets using an automated closed-loop for a group of sensor devices.

The process and system may combine upstream multi-sensor data received from multi-modality sensors 108 using a fusion pipeline 102 with the adaptive sensor management of a sensor controller 104, as illustrated in FIG. 1. A Bayesian Program Learning (BPL) Reasoning Engine 106 may learn and recognize HVT characteristics and behaviors and recommend the targets for higher priority focus by the sensor management capabilities of the sensor controller 104. BPL 106 affords a rich, compositional, fast learning capability for modeling complex, subtle features and behavior models with data received from a fusion pipeline 102 that are ideally suited for adaptive knowledge and information for target analysis.

The sensor controller 104 can cooperatively manage sensor nodes or sensor assets to address the adaptive fusion, analysis and reasoning of multi-source data for enhancing moving target engagement at scale. This technology can adaptively provide a loop between upstream fusion, learning of High Value Target (HVT) models for high performance recognition, distributed cooperative sensor management on individual platforms and distributed inter-platform cooperation.

This system can use probabilistic examination of targets for automated closed-loop use of sensors to provide methods and techniques for Find/Fix/Track (F2T) functionality over multi-modal sensors and data. FIG. 1 illustrates an example high level functional architecture for closed-loop multi-sensor, multi-platform SG data collection and processing. This framework supports automation of sensor grid (SG) processing and control to detect, track, classify, and identify (DTCI) targets of interest. Methods can be used that jointly combine data across the SG to perform multi-sensor, multi-platform data fusion and combine information from fusion and top-down objectives to manage to SG platforms and sensors to increase overall situational awareness (SA).

Figure 2:
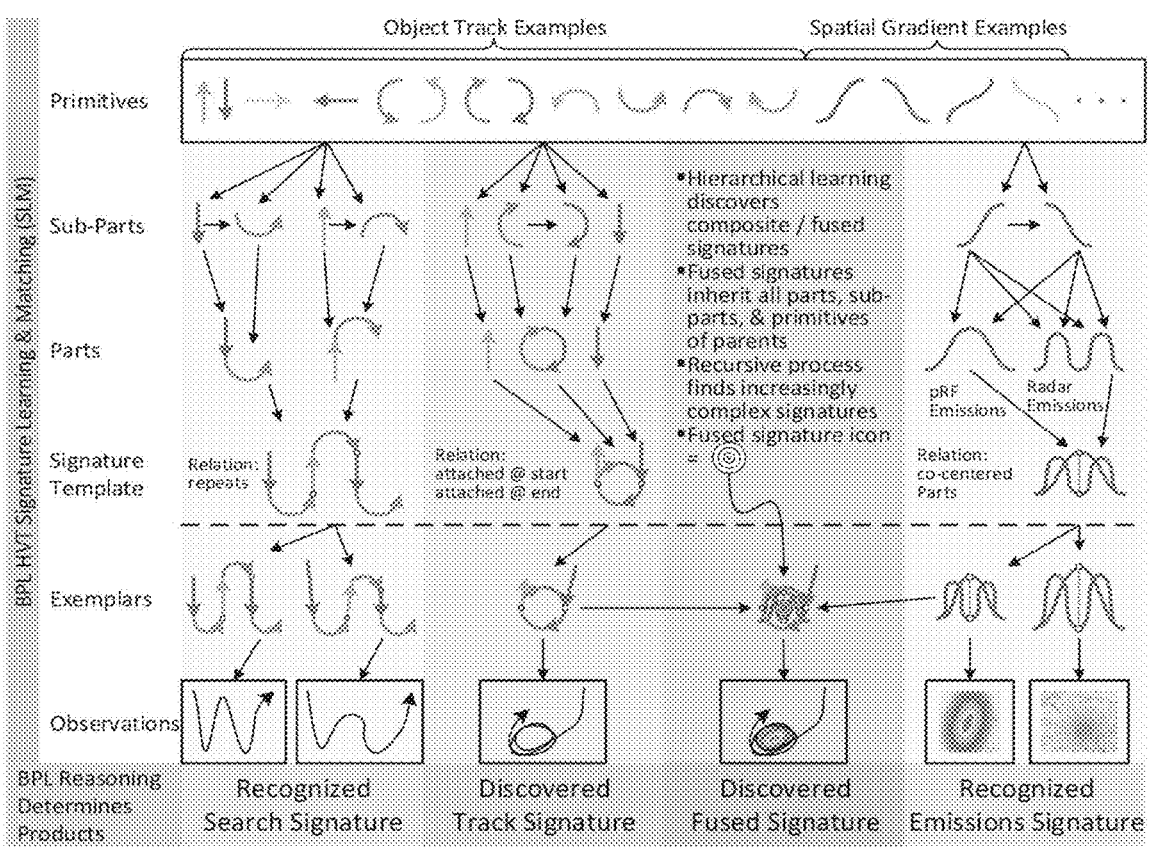
FIG. 2 is a chart illustrating an example of a feature and behavior pattern learning capability that learns primitives used to recognize target feature and/or behavior patterns.

This technology enhances collaborative sensor behavior across a heterogeneous sensor grid (SG) to maximize detection, tracking, classification, & identification (DTCI) performance and achieve superior situational awareness (SA) and high value target (HVT) recognition in complex scenes. FIG. 2 illustrates a feature and behavior pattern learning capability that learns primitives, models or signatures that may be used to recognize complex HVT features and behavior patterns with very limited training data.

In one embodiment, the primitives may be used to generate a new path for a robotic device. Such tasks may be complex tasks that are composed to perform multiple actions. For instance, the movement path may be to pick an item, sort and place the item, and transport the item to another location. Primitives may be used for the pick, place and transport operations. A user may provide an instruction for the robotic device to perform a high level action. Then the primitives may be stitched together by BPL to do the requested complex task. For example, the primitives may include instructions such as: grasp an object in a certain way, avoid certain objects when moving, setting robotic poses, determining timing, determining a movement speed, etc.

The primitives may include aspects of a target other than just motion. Primitives may include other features that may be attached to the primitive, such as a name of object, a place you want to place the item, an object type, etc. The primitive may contain anything in the training data set or a success based learning task (discussed later). A primitive may even include a fault or error action to be taken if the specific primitive does not execute properly.

Figure 3:
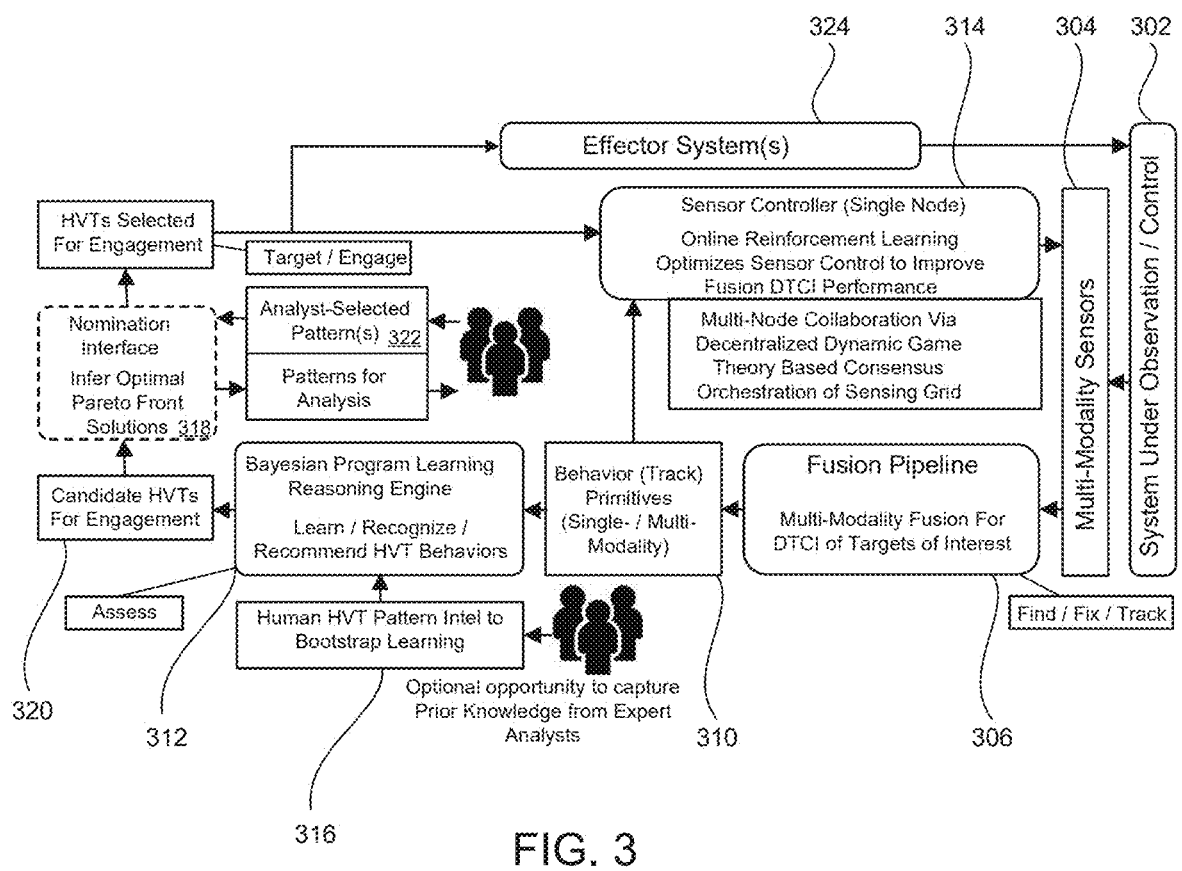
FIG. 3 is a block diagram illustrating an example of a sensor grid that receives data about the area under observation and processes the information using a Bayesian Program Learning Reasoning Engine.

FIG. 3 illustrates that a multi-modal SG receives data about the system under observation/control 310 (e.g., in an Area of Regard (AOR)). The fusion pipeline 306 performs fusion for Detection/Tracking/Classification/Identification (DTCI) over the sensed modalities and data from the multi-modal sensors 304 and over time to Find, Fix, and Track actors within the AOR. Upstream fusion of locally-acquired multi-modal measurement sensor data updates a joint probability space (that encodes the information available to the host platform, as well as new information made available by cooperating SG platforms).

The fusion track outputs 310, including compact multi-modal representations, serve as inputs to the Bayesian program learning reasoning engine (BPLRE) 312 and to the sensor controller 314. The BPLRE uses the DTCI inputs to generate and use primitives to efficiently learn complex, multi-part, dynamic behavior signature models of active or moving targets or entities in the AOR. BPLRE uses these models to recognize potential HVTs from their behaviors given an evolving DTCI track or activity picture.

BPLRE may operate in both supervised and unsupervised modes to learn models for both known (labeled) and unknown (new) targets, behaviors, and phenomena. BPLRE's human-like learning capabilities in a probabilistic framework with probabilistic generative models are expressed as structured procedures to combine primitives and composites of primitives in an abstract description language. The incorporation of primitives are useful in challenging data conditions because the primitive use can break the behavior recognition into subsets, rather than trying to distinguish thousands of targets from one another without understanding shared structure found in their activity and/or movement tracks.

Analyst expertise 316 may provide HVT behavior training examples to bootstrap BPLRE model building. This capability may leverage large language model (LLM) technology to convert analysts' natural language descriptions and/or example HVT imagery to produce inputs (e.g., primitive patterns) for additional, focused BPLRE model learning and recognition.

A nomination interface 318 can receive candidate HVT behavior profiles 320 from the BPLRE 312 and present the profiles to on-the-loop human analysts 322 for engagement adjudication (i.e., should these targets be engaged). In a complete F2T2EA (Find, Fix, Track, Target, Engage, Assess) context, engagement nomination would ultimately inform effector systems 324 (e.g., weapon systems or pursuit systems) for target prosecution or pursuit.

Whether or not engagement nominations are provided, the sensor controller 314 can use online reinforcement learning (RL) to optimize sensing grid parameters to improve DTCI and SA (situational awareness) performance. Engagement nominations may receive priority in the control pipeline optimizations. RL-based sensor control improves SA achieved by a SG operating over an AOR. Online Kernel Least Squares Policy Iteration (OKLSPI, an online reinforcement learning method combining dictionary learning with classical Q-learning) operating over fusion pipeline track outputs 310 may control a multi-modality sensor platform 304 (e.g., a pan/tilt/zoom electro-optical camera, a radar, passive radio frequency sensor, etc.) to maintain persistent surveillance of targets (e.g., objects) of interest. Learned OKLSPI policies offer significant generalization ability, with a sensor platform being able to successfully track an observed object well past the observed training period.

This sensor controller approach leverages game theory for collaboration between SG sensor controllers 314 to achieve distributed optimization across a SG that improves target tracking maintenance, especially of nominated HVTs. Using a combination of game theory optimization, reinforcement learning, and consensus optimization for multi-agent systems, each dynamic agent (such as a multi-modal SG node) is a self-interested decision-maker. Interaction between agents occurs over a dynamic communication graph. The goal is to optimize a global utility function by enabling sensor nodes to make individually rational decisions that optimize their utility functions based on the online reinforcement learning method. The resulting optimization problem has two aspects. First, utility functions (or reward functions) for the sensor node agents align individual goals with cooperation between these agents. These utility functions focus on local node performance while contributing to the overall global utility function. Second, sensor nodes have a negotiation mechanism through which they can optimize their utility functions within the entire SG context. This negotiation mechanism is a consensus problem transformed into a noncooperative differential game problem. This mechanism determines the desired value function for the SG as a whole and the corresponding optimal control strategy, even with minimal connectivity assumptions on the communication topology.

The techniques used can be focused on improving Find, Fix, and Track (F2T) performance over multi-modality data. The system may feature three interacting technical components to achieve better F2T performance. The first may be a fusion pipeline 306 that detects, tracks, classifies, and identifies (to the extent possible) targets across an area of interest (AOI). Leveraging the DTCI capabilities of the system, this pipeline jointly combines data from available sources to perform multi-sensor, multi-platform data fusion that exploits data in the rawest form feasible to take advantage of intermodal dependencies.

The second technical component is a Bayesian program learning reasoning engine 312 that takes the fusion pipeline-enhanced track picture and identifies which tracked object characteristics (e.g., physical features) and behaviors (e.g., track paths evolving over time, RF emissions, etc.) match learned models of HVT characteristics and behaviors. Additional reasoning capability is provided between the fusion pipeline 306 and sensor controller 314 in the nomination interface 318 or component that nominates HVTs within a scene.

The third technical component may be the sensor controller 314 which leverages fusion and reasoning information to manage sensing assets. This component may leverage the autonomous active sensing learning controller that exploits multimodal sensor data fusion representations to enable active sensor management processes to adaptively optimize sensor and platform control actions. This sensor controller 314 determines, for example, which sensing parameters to adapt and/or control to reduce the relevant uncertainties and to make the correct trade-offs while taking full joint advantage of measurement level data.

FIG. 3 illustrates that a multi-modal SG receives data from the system under observation/control 310 (e.g., in an Area of Regard (AOR)). To summarize FIG. 3, data may be ingested from multi-modality sensors 304 and may be processed through the fusion pipeline 306 to maintain an accurate tracking picture. The Bayesian Program Learning Reasoning Engine 312 may ingest tracks (including their fused features) and recognize and recommend HVT candidates for engagement. Candidate HVT tracks are selected via a Nomination Interface 318. Selected HVT tracks, along with their fusion pipeline outputs feed the Sensor Controller 314 which modifies sensor parameters to maintain tracking of HVTs to support engagement activities 324. An optional knowledge capture element enables experts to bootstrap the BPL learning process by providing natural language descriptions of HVT characteristics and behaviors 316.

Figure 4:
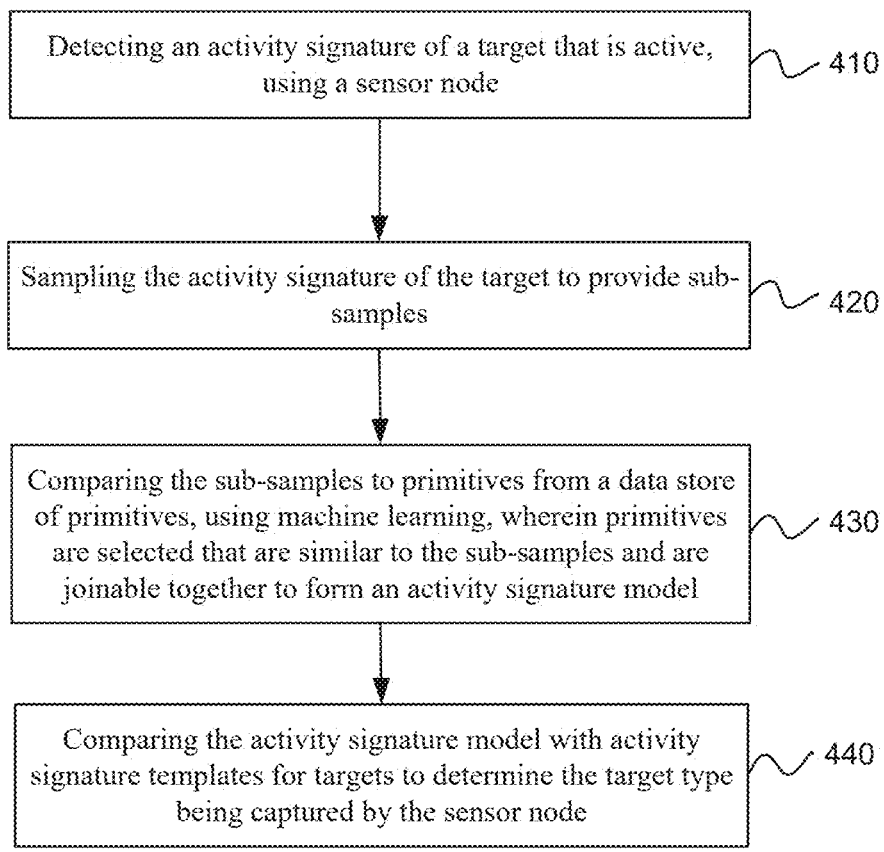
FIG. 4 is a flowchart illustrating an example of a method for detection of targets and determining whether the targets are high value targets using primitives.

One operation in a method, as illustrated by FIG. 4, may be detecting an activity signature of a target that is active, using a sensor node, as in block 410. An active target may be a moving target, a stationary target that emits RF signals or other electromagnetic signals, a target that performs a stop-and-go type of motion, a state change (e.g., a heat change, a color change) or any other target with activity. An active target may have active behavior in physical space or in any state space detectible by different sensing modalities.

The activity signature of the target may be sampled to provide sub-samples, as in block 420. In one example, the activity signature may include: a travel path, electronic communication attributes, target attributes or other target related information. There may also be a data store of attribute types for the target type that are detectable. The sensor bias can be increased for attribute types selected from a data store for the target types. For example, if a target is known to be more detectable using IR, then the sensor bias for the parameter (e.g., IR) can be increased.

A plurality of inputs may also be detected for the activity signature, and the plurality of inputs may be separate modalities or attributes associated with the target. More specifically, the separate modalities may include: a camera, electro-optical (EO) sensors, infrared sensors, radar, LiDAR (light detection and ranging) sensors, radio frequency (RF) sensors, acoustic sensors, vibration sensor, seismic sensors or any other sensor modality. The plurality of inputs may also be stored as compact multi-modal representations used as portions of the activity signature. This may include mapping a plurality of sensor signals with separate modalities into a reduced space. The modalities in the reduced space that have a better signal can be selected as priorities for target monitoring. The events from separate modalities may be associated together to improve the recognition of targets.

The system may further process the plurality of inputs to determine which inputs or modalities are more successful at tracking a target type. If some inputs or modalities are more successful than other inputs, then the system may prioritize more successful inputs when tracking targets. For example, the plurality of inputs may be processed to determine which inputs have a higher signal-to-noise ratio when tracking a target type. Then inputs with a higher signal-to-noise ratio may be prioritized when tracking targets.

The sub-samples may be compared to primitives from a data store of primitives, using machine learning, as in block 430. Primitives may be selected that are similar to the sub-samples and are joinable together to form an activity signature model. Bayesian program learning may be used to determine whether a primitive matches a sub-sample. The data store of primitives may have been extracted from an aggregate grouping of recorded activity signatures for target types. The primitives may be motion primitives, electronic emission primitives, target attributes or other activity primitives. For example, the primitives may be motion primitives that include target electronic communication attributes which have been detected during motion or when a target is not moving. The primitives may also include attributes (e.g., size, color, shape, velocity, brand, model, etc.) related to targets during an activity period.

In one example, a high value target may communicate on a communication channel or frequency. Then as the HVT moves from A to B, the communication transmissions at points in a map can be recorded as part of the activity signature or track. More specifically, there may be an RF attribute or signature (e.g., signal energy, signal entropy, doppler shift and delay, etc.) that may be associated with tracking of what is viewed on the ground. Any type of electro-magnetic or optical emission can be captured as an attribute. This might include EO, IR (infrared), passive RF receiver, acoustic, seismic, etc., and the sensor grid can detect the frequency channel that the target is emitting on. This data can also be tracked on a visible display. Accordingly, the primitive may be information about the target in the electromagnetic spectrum space (frequency and time). An analyst can request a search for certain transmission states or frequencies using language or a prompt sent to the system. That information can be translated into primitives using the BPL. The translation of this information into primitives enables the system search for the information through BPL.

The activity signature model may be compared with activity signature templates for targets to determine the target type being captured by the sensor node, as in block 440. The activity signature templates can be provided by analysts. If a target moves from point A to point B and stops in a location C and keeps moving, the attributes associated with this travel may be compared to the activity signature templates. This activity signature template can be compared to the tracking information that was extracted from observing the scene (e.g., using a sensor grid). When a sensor system observes the scene, multiple activity signatures and/or tracks of multiple vehicles, people or objects may be detected. This provides an activity history (e.g., a travel line) over time and/or space. A template that represents a high value target's behavior can be compared to the activity signatures and/or tracks identified by the sensor grid. For instance, a subset of activity primitives (e.g., tracks or communication broadcasts) can be extracted from the activity signatures and then a determination may be made that the activity signature is similar to the template representing high value target. This process may be used to detect a set of high value targets using the data and a top-down approach that uses a template provided by the analyst.

In another example, a template may represent what a specific airplane type looks like, what a specific drone looks like, what a helicopter looks like, what a tank looks like, etc. The template may also include a target type identification at more than one instance in time or a behavior that evolves over space and time. When the target drives from point A to point B and emits a RF signal at spatial point B during time C, this is activity that is spatial and over time. For instance, a line on a map with activities (e.g., electro-magnetic emissions) that occur at certain points on the line may be an activity signature. Similarly, a stationary item may emit state changing signals over time (e.g., RF, radar, infrared, etc.). Such activities may be tracked from a UAV with downward pointing sensors. This may include tracking vehicles and people moving or changing state. If an activity history or a trajectory is tracked, then this track may be a line, a trail, history of movement, a history of state changes for a stationary object or intermittently moving object, etc. Such templates can be compared to the candidate high value target track or activity signature. Instantaneous recognition may not be as important as recognition of certain events or travel evolving over time. In intelligence situations, users might need to identify terrorists traveling on the ground (e.g., carrying the bombs). Their paths may be recognizable and so the bad actors can be identified. The template may provide certain defined behaviors that the system is searching for or matching for. The templates can be matched to the recently obtained activity signatures (e.g., tracks) that are processed in real-time. This may allow a user or an AI detection process to narrow down focus to a specific area and see a group of vehicles working together.

A target that is identified may be determined to be a high value target and receives a higher priority focus from a sensor network. The interaction of a plurality of activity signatures may also be tracked to determine a goal of a plurality of targets.

In one example of spatial movement, the sensor grid may observe an object below them, things on the ground or people on the ground to create tracks. Those tracks can then be segmented into primitives. The primitives corresponding to the tracks may be: a straight line, a curvature, a U-turn or identifying primitives in the tracks to make it easier to match the track with a template. Otherwise, trying to match the exact patterns on the ground to an exact template results in very few matches. By breaking a track up into primitives, then the track has better candidate portions to match with a template for the type of target. Using the primitives to represent the track also avoids trying to match one long track with a template, which is unlikely to match with any template, but instead a number of segments are defined that include a straight line, a curve, moving velocity, etc. This provides a richer representation of the track that you can associate with a similar high value target template. A probability can be measured and each of the matching candidates' templates may be assigned a matching a probability. When a template has a 0.85 or 0.9 matching probability with a target, then the system can focus on those targets (e.g., vehicles) as high value targets for the sensor grid to track further. This allows the system to narrow down the selection of what is high value targets while avoiding strictly deterministic selection.

In one embodiment, this technology can capture a multitude of inputs in a plurality of modalities. These inputs can be converted into a track or path to chase a high value target. Being able to capture a multitude of intelligence information that describes a high value target, then allows the information to be interpreted as primitives provides the ability to chase targets on existing tracks.

Figure 5:
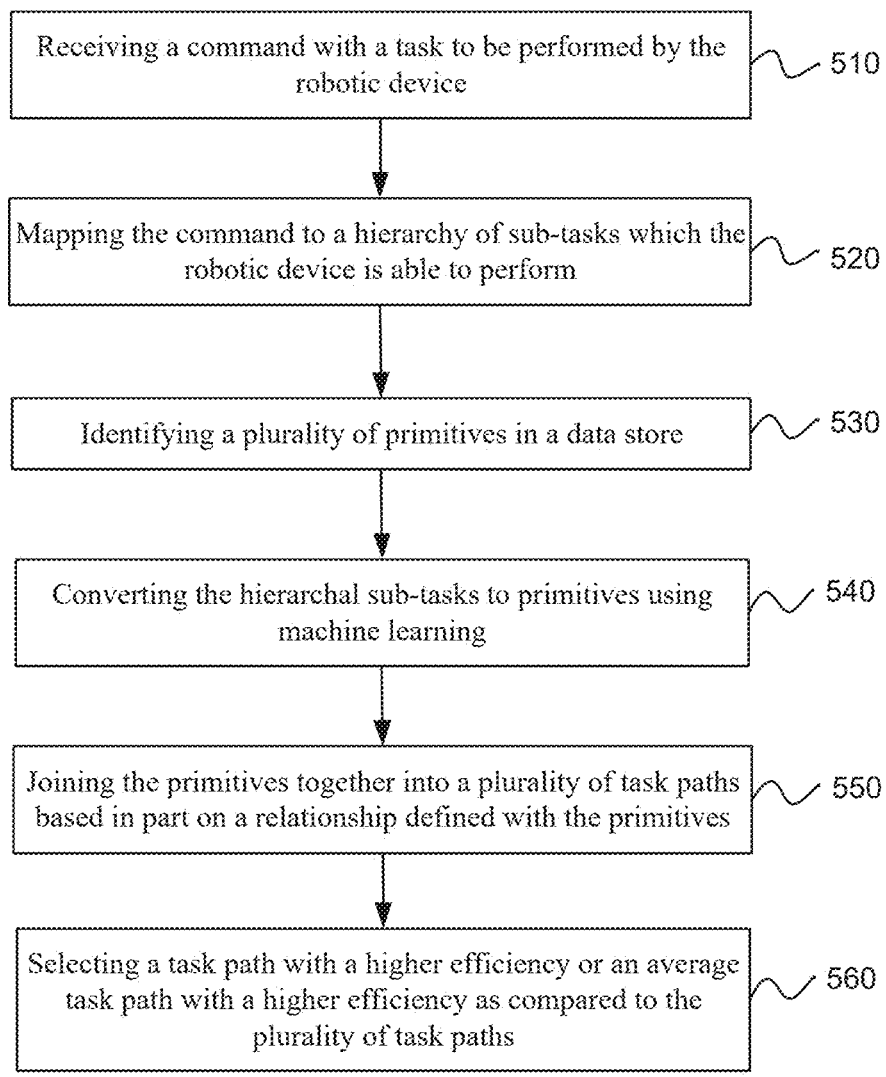
FIG. 5 is flowchart illustrating an example of a method for task path generation for a robotic device.

FIG. 5 is a flowchart that illustrates an example method for task path generation for a robotic device. Bayesian Program Learning can be applied to robotic devices to create a new task path. Primitives that are basic motions captured from training motions for the robot (e.g., sample motions created by humans) can be used and stitched together to form the task path. This allows the system to receive a task to solve and then the primitives can be used to solve the task. This process can find an efficient combination of primitives that solves a task (even over the long horizon).

The method may include receiving a command with a task to be performed by the robotic device, as in block 510. The task may be received that is: a spoken instruction, a text instruction, a graphical instruction, a video instruction, a tele-operation derived input, a task formed from extracted operations from at least one recording of humans carrying out tasks, a task formed around a range of acceptability around a trajectory from pre-recorded tasks, a task determined from a previous task that was completed or a task triggered by arrival of an object. A user or analyst who is observing the scene can provide input text or language and that command may be mapped to primitives of motion. The user or analyst may have many of their own personal inputs create the task or prompt, including a map of an area and their own observations. The user may know that a person is talking on a frequency on a communication device, and that information can be associated with a spatial detection. Such information may be included in the user's task or prompt. In one example, a task can be determined or selected from having a previous task completed. This may mean that task Y will trigger the execution of task Z. The arrival of an object may also trigger receiving of an additional task where the robot is expected to complete the next step in a series of tasks. This may be a hand-off of an object from a human, robot, or another kind of machine to the current robot. When an object or a specific object arrives, the current robot recognizes this object and may activate the next task.

Another operation may be mapping the command to a hierarchy of sub-tasks which the robotic device is able to perform, as in block 520. The hierarchy may be generated by the decomposition of the task into sub-tasks in any hierarchical structure, such as a tree or a queue of sub-tasks.

A plurality of primitives may be identified in a data store, as in block 530. The primitives may represent movement primitives sampled using a sample from recorded example movements of a robotic device. The example movements of a robotic device may have been created by a human controlling the robotic device.

The hierarchal sub-tasks may be converted to primitives using machine learning, as in block 540. The hierarchal sub-tasks may be converted to primitives by selecting primitives using Bayesian program learning. In order to generate paths, high level instructions are mapped to detailed instructions or sub-tasks, and those detailed instructions or sub-tasks are mapped to primitives. The primitives can be used to form bigger patterns which can be executed to satisfy a command, prompt or request.

The primitives may be joined or stitched together into a plurality of task paths based in part on a relationship defined with or between the primitives, as in block 550. For instance, it may take 10 milliseconds to stitch together complex motions upon request. The primitives when stitched together can identify either the motion for the task of the robotic device. Stitching primitives together creates dynamic motions that are not likely to even be anticipated from a human's experience but these motions may be highly efficient. If the robotic devices constraints are well modeled then the system can create motions that may not have seemed possible based on the robotic device's defined abilities. Accordingly, the robot can do things that may not have been expected based on what the designers of the robotic device anticipated but the designers were not aware of those capabilities.

A task path may be selected with a higher efficiency or an average task path with a higher efficiency as compared to the plurality of task paths, as in block 560. In one example, a plurality of task paths may be generated using Bayesian program learning. Then a generated task path may be selected which maximizes a gain over a distribution of the task paths.

A Bayesian posterior operation can create multiple paths. The distribution of paths allows one of the paths to be picked from the overall distribution. Then maximum a posteriori can be applied to enable the selection of a path that maximizes the gain over that distribution. Alternatively, an average or mean from the presented paths can be selected to be executed. The group of paths may be considered to be within an envelope representing generated variance. It is possible to pick just one track by using the mean or other deterministic selection techniques. In any case, a number of primitives are generated for paths and the path to apply is picked from the generated paths. Bayesian statistics provides a group of paths or activities that may each solve the task (e.g., some are worse or better). Then the system can select a desired task or path using the optimization process (e.g., maximum a posteri distribution). Other paths may actually work but may be slightly worse while still satisfying the task.

In one example, a language description can be converted into a motion description. The user or intelligence analyst can describe a pattern or target in a form of language, and this language is mapped to the primitives that may be used with the Bayesian learning process. The language description may be "move a ball to location A". The move may be mapped or decomposed to sub-tasks: "go to neutral pose", "have perception identify a ball and its pose (x,y,z)", "move the robot from neutral pose with end effector being normal to any surface on the ball", "move the gripper", "open the gripper and close gripper", "receive feedback that the ball was in the closed gripper", and then "move the ball the correct location". These sub-tasks can then be converted to primitives, as described earlier.

This technology allows a system to have a data store of primitives and create a new task or task path that has the purpose requested by a user. For example, a user may instruct the robotic device to move from point A to point B, move in a circular motion, or move in circular way, etc. When a task path is created that has a circular trajectory and then is applied using the robotic device, this task path may be a task path that is composed of primitives that are arcs. Using a combination of primitives, such as arcs, lines, curves, etc., the system can construct not only a circular trajectory but more complex motions.

Human demonstrations may be used to illustrate or train the BPL regarding how a robotic task may be performed. The primitives may be extracted from human demonstrations or the primitives may be created by a robotics expert. The human demonstrations can be matched to the best way to perform the robotic task given the primitives available. Thus, the task execution can be improved or optimized based on the basic primitives that have been captured in a library or primitives.

In one example, a task may have been received from spoken instructions, text or some other way. Then the task can also be stitched together from primitives in a data store using BPL. The stitched task can be compared to a similar task that looks good to see if the task can be feasibly completed. Many different variations of the task may be created that are feasible and efficient. Then an efficient task may be selected. Using machine generated tasks means that a human does not have to deterministically create the tasks over and over for robotic devices when the tasks are created or changed. New tasks can be created for a robotic device using the basic primitives that satisfy the goal or instructions without shutting down the robotic device and/or related system.

In another example, a user may want a robotic device to move an object from point A to point B. Then the Hierarchical BPL can stitch together the primitives for a task path. If the task path is deemed to be feasible and efficient (by comparing it to other similar tasks), then the task path executes.

This technology may use what can be called success based learning to provide a template or templates to generate tasks. The success based learning motion may be broken down into primitives that include: straight line, curves and arcs. Other types of specific robotic device primitives may be identified for specific robot types, such as: grasping, avoiding objects, inverting an end effector, rolling a limb, etc. The system and robotic device may then receive the task or instruction to pick an object. The general instruction may be mapped to a hierarchy of actions to complete the task. For example, the actions may be approaching the object, moving the big arc, avoiding object, and placing the object. This larger task is created from the individual primitives. The tasks completed by humans can be sampled to obtain these smaller primitives. In one embodiment, success based learning can be used to generate motion primitives or the primitives may be created by human experts. These primitives may be combined into a complete task by the BPL.

A data store for successful task plans can be created for the success based learning. A data store of task completions may record task completions performed with a person controlling the robot directly. The person or user can tele-operate the robot and perform tasks with the robot. This allows the human to control the poses, movements and trajectory of the robot directly. The correctly completed task plans or successful task plans may be stored in the data store. For example, the successful task plans may have recorded how to pick up an object and translate an object in the workspace. In another example, a human may control a drone flying through the air, water or space.

Success based learning in a robotic device environment allows the user or person to execute an operation repeatedly and record the completion of each successful task. The recording of the multiple operations or many versions of the same task or task type can generate a variance or tolerance for the task or task type. A human who does an operation for a task will typically be within 1% of perfect every time. This indicates that the success based learning data store will have some variation for operations but not a large amount. The greatest variation may be in accommodating robot degrees of freedom (DOF) and the user may have to pick up an object in various ways for oddly positioned work pieces and to match a robot's DOF. The user may position objects in various positions to train the robot that the robot can pick-up objects in certain ways. Most robots have five or six degrees of freedom (DOF) and the user can perform operations to be recorded (e.g., some awkward things) to make up for the loss of one to two DOFs in some robots. The reduced DOF for a robot allow a work environment to impose constraints so that less expensive robots can be used.

The success based learning can provide a data store with only successful or good task plans. The good task plans can be identified without spending an inordinate amount of time extracting out successful task plans. Success based learning can also bypass a collection of time intensive and statistically suspect methods of identifying success for tasks. Success based learning allows a person to be involved and so a stored task is known to be successful and 100% good, when stored.

The size of the data store storing the task plans can be increased as time passes to include task plans with changes in configuration or environmental details that did not exist initially. If for example, a new object is located in the environment, then the robot can detect that object and form new task plans for the new object in the environment. This may result in a new branch or collection of recorded operations and task plans in the database. A human may also create new tasks for the detected workspace variations as they are detected. This may ensure that any new task plans are 100% correct. Creating a success based data store is time efficient, and can handle higher complexity task plans than reinforcement learning or similar machine learning models can generate.

In one embodiment, when the robot encounters an unsatisfactory situation or an error condition, then a person can intervene with an appropriate teleoperation interface and perform the task. This successful task can be stored into the success based database. Of course, the task can also be immediately used by the robot to perform the currently desired operations. Gaps in the success based data store may be filled by allowing the success based data store to be added to interactively upon failure of task plans created for the robots.

One result of the present technology is to return control of a robot and the programming of the robot to people who own the robot. An efficient way is provided to enable reprogramming of robot tasks so that changes to the robots work patterns are not a huge economic cost each time the robot's tasks change. The use of robots in the world is widely spread, especially in manufacturing, and having a robot in a manufacturing plant is useful. However, it can be expensive and difficult to change what the robot does. For example, the robot may need to be down or inoperable while changes are being made and it may take an external third party to setup a new robot schema. This technology can provide a human machine interface that is effective, efficient and simple, so the users in a manufacturing plant can change, modify or create the tasks the robot performs without engaging the third party. Ideally, the interface may be so efficient that the robot is only disabled for a limited time (e.g., 30 minutes) and then the robot and system are reconfigured and ready to perform tasks again. Further, this technology can provide robots with closed-loop autonomy where the task plans are modified in real time in response to environment changes or other needs without deactivating the robots.

Figure 6:
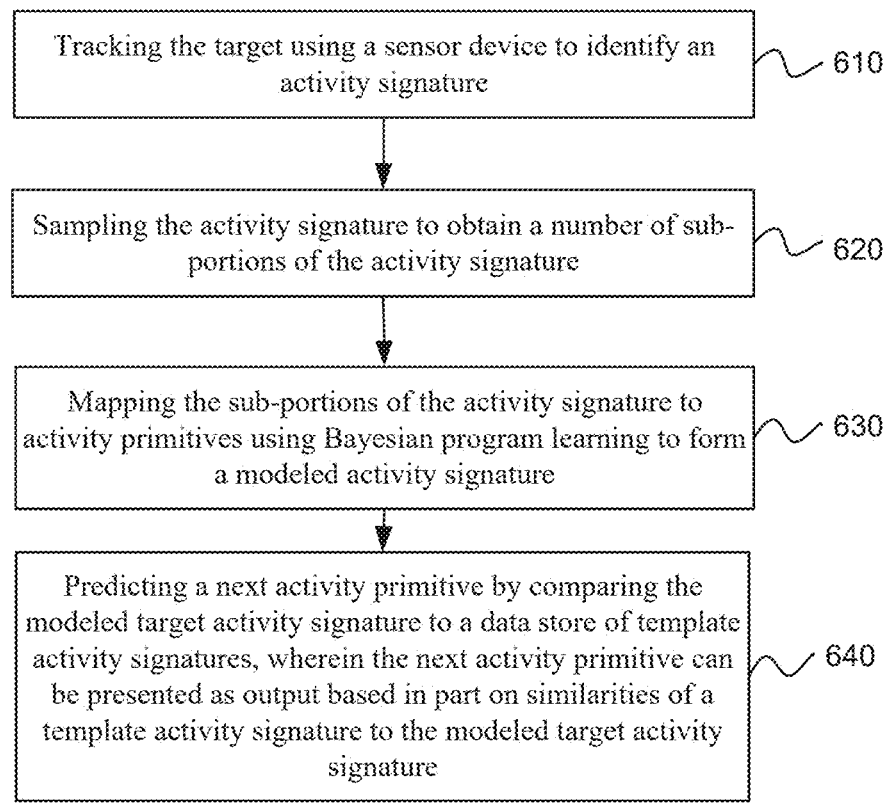
FIG. 6 is a flowchart of a method for predicting motion of a target.

The behavior or activity of a target may also be predicted using activity signature models (e.g., template target tracks) in the case of missing measurements by nodes in the sensor grid (SG). FIG. 6 is a flowchart for a method for predicting activity (e.g., motion) of a target. The method may include tracking the target using a sensor device to identify an activity signature (e.g., a location of the target and a target track), as in block 610.

The activity signature (e.g., target track) may be sampled to obtain a number of sub-portions of the activity signature (e.g., target track), as in block 620. The sub-portions of the activity signature may be mapped to activity primitives (e.g., movement primitives or signal primitives) using Bayesian program learning to form a modeled activity signature, as in block 630. The activity primitives may be activity primitives (e.g., movement primitives) sampled from a data store of recorded sample activities (e.g., movements) The data store may be an example of a success based learning data store.

A next activity primitive (e.g., movement primitives) may be predicted by comparing the modeled activity signature to a data store of template activity signatures, as in block 640. The next activity primitive can be presented as output based in part on similarities of a template activity signature to the modeled activity signature. For example, a user may be notified of the next activity primitive as a probable next activity (e.g., movement) of the target.

In an example of this process described above, BPL can be used in the prediction process. For example, a truck may be detected and the truck path is composed of primitives. The system can guess what next possible primitive would come next. If the sensor grid tracks the truck into the tunnel, the truck track that was decomposed into primitives can be used to predict the next primitive that may be used using BPL. Then a sensor device or the sensor grid can re-detect the truck after the comes out the tunnel or take a new measurement. In the past in sensor systems, when a path or activity signature has a discontinuity, then the system may assume the target is a different target. However, this system provides continuity for a target where continuity is predicted to exist. If the truck enters a tunnel, the location where the truck may exit the tunnel can be predicted. If the target is re-detected or the prediction was correct, then the system knows the target is the same target.

In one configuration, the application may predict that a target may turn on one direction. For example, the prediction may be that the target will turn left. This can use hypothesis based matching where there is missing data and the system hypothesizes or predicts what comes next. For example, a curved primitive or a straight primitive may be used to predict the target's next action and the predicted primitive can be stitched to the previous primitives. The context from a spatial map, other surrounding roads or map items can be used in this prediction.

One goal is to try to maintain a continuity for a track of a target by using the primitives. This is useful when measurements are obscured or missing, such as when the system cannot see the item using a sensor in the sensor grid. This may occur when the data or video feed from the sensor may be jammed or a camera may simply be distorted. Such interference, sampling problems or communication problems may result in intermediate failures of the measurements. However, this technology may form a history of the target's activities with BPL, and then multiple hypotheses for the next activity or movement can be predicted. Then when the next measurement is received from a sensor in the sensor grid the prediction can be confirmed. Accordingly, the use of primitives can be applied to maintain continuity when tracking targets.

The interaction of identified tracks or activities can also be used in tracking or identify targets. The interaction of multiple tracks may be analyzed to track the targets. For example, two vehicles may meet up and may be tracked together. The system can be recording and building the scene for multiple vehicles or targets. Tracks from multiple directions and multiple vehicles can be matched against a template that can represent a desired pattern (e.g., terrorism activities, intelligence activities, war activities, etc.) For example, the sensor grid can track the behavior of vehicles converging on a location and stopping, then the system may determine the targets are building a camp. This use of template matching increases the certainty associated with that collection of models.

The system may scan for the target using at least one sensor node to validate or invalidate the probable next movement of the target. For example, at least one sensor node may alter the sensors' parameters for sensor nodes to search for the target. In addition, the sensor device may query a sensor grid of other sensor devices to find additional information regarding the target.

Context for the target may also be obtained from at least one of: a spatial map, roads, spatial features or map items used to predict a next movement primitive. A data store of attribute types for the target that are detectable may also be stored. Sensor bias may be increased for attribute types selected from a data store for the target.

The role of dealing with errors or discontinuities in tracking will now be discussed. If a target goes into the tunnel but the does not immediately come out of the tunnel there will be no measurements. The system can ask a sensor to hover and wait at an expected exit point or the sensor can explore. Eventually, an update can be provided to the analyst when the target is re-acquired or an error default time has passed. In addition, a sensor can autonomously just move around to find the target. If you lose the target, and your field of view (FOV) is limited and if there are no collaborating sensors, then the system can explicitly ask the other sensors what they see. If just one sensor goes into exploration mode which starts turning the camera or moving the sensor to find new things or other indications then human feedback may be needed.

In one configuration, the error state may make assumptions based on a primitive that can be predicted, or the error state might communicate with the bigger sensor grid to find more information. If the same sensor finds the target again, then the sensor can prove a prediction was right. The operator might view the primitive being predicted or a location of the last time the system tracked the target. Alternatively, the sensor node may stay in the same location and keep detecting and/or scanning. A prediction primitive may be shown on a display to an analyst and the prediction primitive may be in a different color, different intensity or highlighted some other way. Information may travel in both directions from the analyst to the system and from the system to the analyst and to the other sensor nodes.

Any type of sensor may be used. The sensors may be airborne sensors, ground based sensors, vehicle based, mobile or stationary sensors, already existing sensors, intentionally deployed sensors, etc. Any type of sensor asset may be used for sensing and many modalities of sensors can be used as described earlier.

The system can be self-correcting and make itself better as time passes. As the system accumulates certain types of errors, then presumably the system may find that certain types of errors occur when certain types of sensors are used. When the system fuses sensors, the system may have more or less errors. Longer term honing of the accuracy of these analytical techniques can be made by recording and iterating on the error. What is a preferred first try for the type of sensor to be used for scanning for a target may be changed, as feedback is received. The system can close the loop on detections and has a goal to maintain detection as long as possible. When there is an error, the sensor node can change the parameters of the sensor node (e.g., camera pan, tilt, yaw, or center frequency of the RF receiver). Losing the target (e.g., a truck) in a tunnel is not an error case but a change in behavior (the target just stays there). The system can inform the analyst with a message that the analyst should look into the issue. The system can also ask other sensors to look somewhere else.

As discussed, there is a fusion of data from various sensors, for example EO (electro-optical) and IR. The IR helps maintain the tracking at night. The fusion of data from multiple sensors can also help if one modality is obscured. Similarly, a sensor node may combine radar with IR. Range can be estimated using Doppler Radar or LIDAR sensors to maintain tracking of a target. If the system is not seeing a target then there are other modalities to use to try to maintain tracking. If all the modalities fail, then no data can be collected. Even with a limited range sensor and a target that is very far away, a moving target can be detected by using parallax and asking other sensors that are closer to the target what data those sensors have obtained. For example, a target might be tracked by another sensor even if there is a tree obscuring the target.

In terms of varying types of targets, the system can combine EO, with IR or acoustic. The system can also choose which detection modalities the system determines are the best. The system may learn to detect a target better by picking or combining modalities. The data from sensors may indicate there is a better sensor available. The targets can be characterized as a set of features, that includes information on the pixels captured, kinematic information, tracks, and other information. That feature set can be updated over time and in different situations. Instead tracking any moving item in a scene with no discrimination, this system can track and classify a high value target (HVT) based on characteristic features of the HVT.

For example, if the person being tracked gets into a F-150 truck, then a listing for attributes or features (e.g., the target's appearance, color, shape, brand, model, etc.) can be provided or looked-up in a data store that are already known about the truck. Knowing these attributes in advance can assist in determining what to monitor. Maybe the system can determine that the system may track the truck better acoustically rather than optically. Acoustic emissions can be used as an identifier for a target. In addition, acoustic emissions can also indicate acceleration, deceleration, or a change in vehicle direction. Alternatively, the IR signature may be unique as compared to another vehicle. Further, a vehicle may be tracked using tire tracks, tank tracks, or thermal tracks through the air or water depending on the type of the vehicle.

Suppose the system knows about N features (e.g., 20 features), the system can choose the better feature(s) for tracking. To select the better features for tracking, the features can be projected into a reduced manifold space. This is an abstract space into which the features are mapped to identify significance, and that space becomes a reduced data space. In the reduced data space, the system can choose the feature that corresponds to a type of sensor (Acoustic or RF), and the system selects the most significant reduction of each modality using an auto-encoder using a hidden layer. This allows the system to re-construct all the features or the system can continue an example of using that in reduced mode. The system can decide using attention which of the features are most relevant. Attention will focus on the data. For example, if EO is obscured and you get a lot of black pixels, then the system can switch from EO to IR.

The type of attention used by the system can be attention and saliency (A&S) which provides a statistical characterization of subtle signal features over space, frequency, time, and varying dimensionality in order to support one or more targets and transmitters/receivers. Attention and saliency (A&S) can recognize important signals using training data sets to define signal importance. Important signals are either similar to the exemplars ("attention" training) or are considered unexpected (e.g., anomalous) with respect to the background (i.e., "saliency" training).

A&S can further reduce the data volume by learning and detecting which signals are "important" targets and signals. Two attention-based mechanisms can be included in the framework to gain insight into the "where" and "what" of attentional focus. 1) A "Softer" deterministic attention captures important signals. 2) A "Harder" stochastic attention mechanism can capture unexpected (anomalous) signals with respect to the background (saliency training), and this harder stochastic attention can be trainable by maximizing an approximate variational lower bound. The attentional mechanisms can play distinct roles. Soft attention categorizes signals as important if they match an exemplar class (Attention). Whereas, stochastic attention categorizes the signals as important if they mismatch the background as well as all exemplar classes (Saliency). A&S sends "Important (Known)" and "Important (Unexpected)" signal with labels to a characterization component. This reduces processing by filtering out unimportant signals. Soft attention can generate a positive weight for each feature vector ("location" i) indicating the probability that location i is the right place to focus for anticipating the next event. Stochastic attention treats the saliency "locations" as intermediate latent variables represented by a multinomial distribution parametrized by a hyperparameter that controls how different types of unexpected events (e.g., a Dirichlet prior) are inferred. The system can monitor all the sensors and pick the sensors or data inputs providing the best signal to facilitate monitoring using projection and the manifold. Even without projecting sensor data into a reduced space the system can use the attention process to select features that are most relevant as the system is observing. The attention process can use the other signals to determine where to direct attention. This allows the system to focus on attention and the system can follow a target or object through several frames.

In attention, the system passes all the features of a target through the attention process and reduces the space into principal components. The system does not have to pay attention to everything. For example, the system can associate the reduced space with an RF signal. This association may give the system the ability to associate events from different modalities together. The system can associate RF features with image features. The system dynamically alters the fused sensors to optimize local detection or the desired goal. With the fused data, you are processing information instead of data, the system can share the compact representation across multiple sensor nodes.

In one embodiment, this technology can be used to facilitate knowledge capture and accelerate learning using expert inputs. A language-based high-value target (HVT) characterization system can generate multi-modal perception-to-behavior HVT patterns of targets using LLMs (large language learning models).

This approach allows for the use of locally hosted, edge-based LLMs and/or Domain Specific Languages (DSLs) to describe potential behaviors of HVTs. It is useful to avoid the use of cloud-based LLMs (e.g., ChatGPT and similar GPT models), which rely on cloud connections that may not be permissible due to cybersecurity protocols or bandwidth limitations and are not viable for edge-processing capabilities.

LLMs can be used to transform multi-modal instructions (such as natural language, images, track patterns, etc.) that potentially delineate a high-value target's behavior into step-by-step instructions, forming a hypothesized HVT signature in the form of annotated tracks projected over specific Regions of Interest (ROIs). These expert-specified patterns serve as potential templates within the BPL framework (at the level of exemplars) for detecting and identifying HVT behaviors from sensory observations and using a Bayesian Program Learning Reasoning Engine (BPLRE) model building over sensory observations.

Experts may produce customizable input prompts for LLMs that create signature programs/templates that teach the BPLRE to recognize those patterns. Since BPL excels in limited-training-data conditions, experts are not required to create expansive catalogs of examples to achieve high BPL performance. Succinct, discriminative, and insightful (relative to features available in the fused multi-modality data) descriptions are desirable and readily achievable by AF (or other) HVT nomination experts.

Such expert-derived BPL programs may be adapted to various contextual environments and create a multi-step hypotheses evaluation system that reasons about HVT behaviors while mitigating the impact of the token limit imposed on LLMs (i.e., limits on the model's performance and usability). Having an upper bound of the token count means the model cannot process any text beyond it. Any contextual information beyond the maximal token window is not considered during processing and may limit the results.

In this approach, LLMs receive both instructions and contextual environmental data and output a task plan for possible HVT behaviors within the updated contextual environment as understood by expert intelligence analysts. These context-driven environmental data are reused in subsequent hypotheses planning, thus eliminating the extensive record-keeping of prior HVT behaviors within the prompts of LLMs. Such prompts may be effective across various context environments using locally-hosted LLMs (e.g., Llama) for robotics applications.

Figure 7:
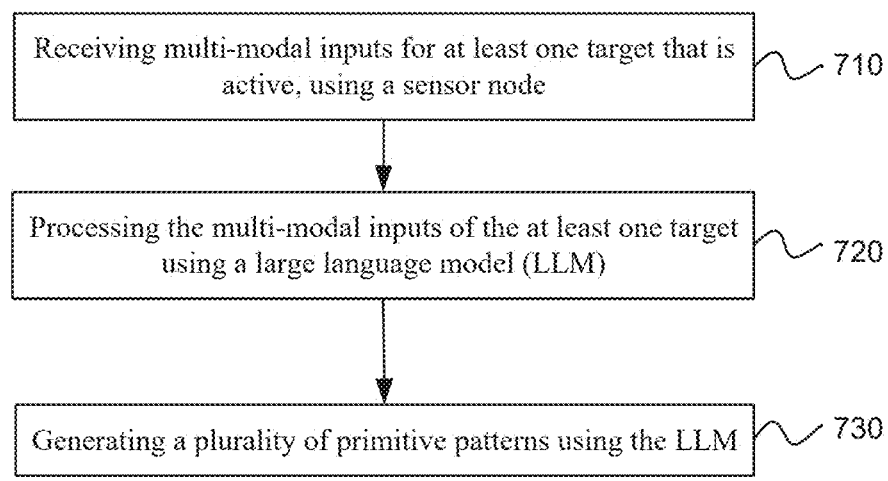
FIG. 7 is a flowchart illustrating an example method for recognition of a target type using primitive patterns.

FIG. 7 is a flowchart illustrating an example method for recognition of a target type using primitive patterns. The method may include receiving multi-modal inputs for at least one target that is active, using a sensor node, as in block 710.

The multi-modal inputs of the at least one target may be processed using a large language model (LLM), as in block 720. The multi-modal inputs may be: an activity signature, instructions, a natural language input, contextual environmental data or images. The LLM can be executed on the sensor node, and the LLM can be executed on the sensor node without using networkable resources. A plurality of primitive patterns may be generated using the LLM, as in block 730.

The samples of a valued target may be compared to primitive patterns, using machine learning. Primitive patterns can be selected that are similar to sub-samples of a valued target and are joinable together to form an activity signature model. The activity signature model can be compared with the activity signature templates for targets to determine the target type being captured by the sensor node.

In another embodiment, the primitive patterns may be used in generating a task plan for a robot device along with instruction input from the LLM and the multi-modal inputs.

Figure 8:
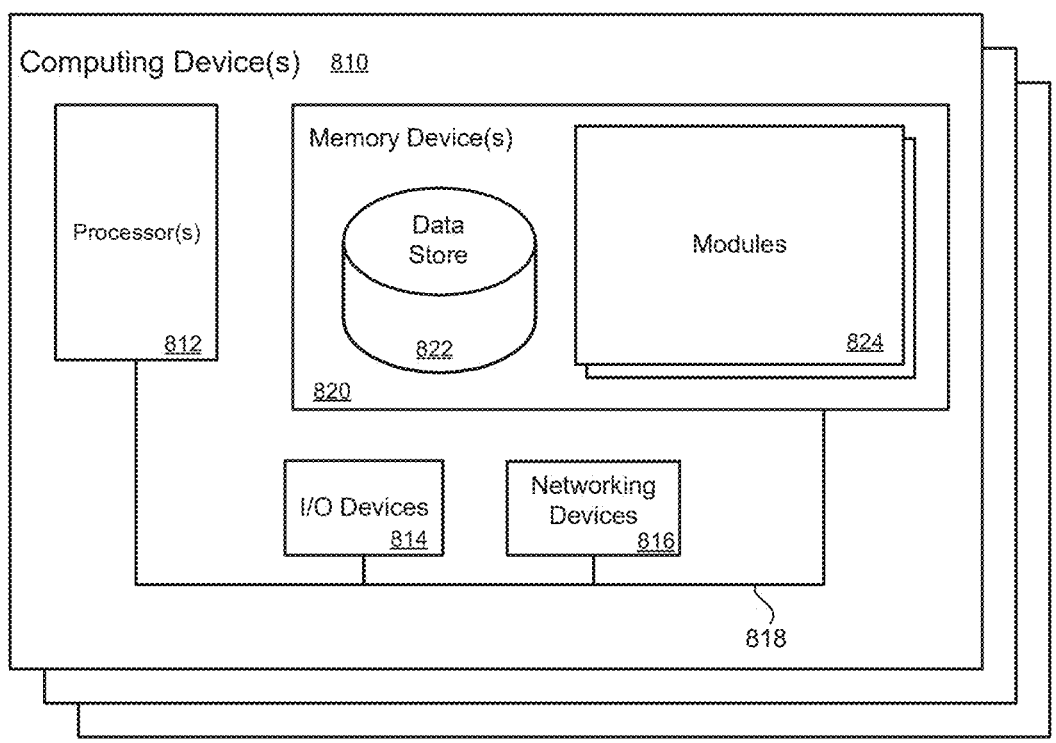
FIG. 8 is a block diagram of a service provider environment according to an example of the present technology.

FIG. 8 illustrates a computing device 810 on which modules of this technology may execute. The computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various examples of the present invention can be referred to herein along with alternatives for the various components thereof. It is understood that such examples and alternatives are not to be construed as de facto equivalents of one another, but are to be considered as separate and autonomous representations of the present technology.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description. Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

Although the disclosure may not expressly disclose that some examples or features described herein may be combined or interchanged with other examples or features described herein, this disclosure should be read to describe any such combinations that would be practicable by one of ordinary skill in the art no matter the specific examples that were described. Indeed, unless a certain combination of elements or functions not expressly disclosed would conflict with one another, such that the combination would render the resulting example inoperable or impracticable as would be apparent to those skilled in the art, this disclosure is meant to contemplate that any disclosed element or feature or function in any example described herein can be incorporated into any other example described herein (e.g., the elements or features or functions combined or interchanged with other elements or features or functions across examples) even though such combinations or interchange of elements or features or functions and resulting examples may not have been specifically or expressly disclosed and described. Indeed, the following examples are further illustrative of several embodiments of the present technology:

Example 1. A method for recognition of a target type using primitive patterns, comprising:
- detecting an activity signature of a target that is active, using a sensor node;
- sampling the activity signature of the target to provide sub-samples;
- comparing the sub-samples to primitives from a data store of primitives, using machine learning, wherein primitives are selected that are similar to the sub-samples and are joinable together to form an activity signature model; and
- comparing the activity signature model with activity signature templates for targets to determine the target type being captured by the sensor node.

Example 2. The method as in example 1, further comprising predicting behavior of a target using activity signature models in case of missing measurements.

Example 3. The method as in any preceding example, wherein Bayesian program learning is used to determine whether a primitive matches a sub-sample.

Example 4. The method as in any preceding example, wherein the activity signature includes at least one of: a travel path, electronic communication attributes, electromagnetic signals, a state change, or target attributes.

Example 5. The method as in any preceding example, wherein the data store of primitives has been extracted from an aggregate grouping of recorded activity signatures for target types.

Example 6. The method as in any preceding example, wherein the primitives are motion primitives.

Example 7. The method as in any preceding example, wherein the primitives are motion primitives that include target electronic communication attributes which have been detected.

Example 8. The method as in any preceding example, wherein the primitives include attributes related to targets.

Example 9. The method as in any preceding example, further comprising detecting a plurality of inputs for the activity signature, wherein the plurality of inputs have separate modalities or attributes associated with the target.

Example 10. The method as in any preceding example, wherein the separate modalities are at least one of: a camera, electro-optical (EO) sensors, infrared sensors, radar, LiDAR (light detection and ranging) sensors, radio frequency (RF) sensors, acoustic, vibration, or seismic.

Example 11. The method as in any preceding example, further comprising:
- processing the plurality of inputs to determine which inputs are more successful at tracking a target type; and
- prioritizing more successful inputs when tracking targets.

Example 12. The method as in any preceding example, further comprising:
- processing the plurality of inputs to determine which inputs have a higher signal-to-noise ratio when tracking a target type; and
- prioritizing inputs with a higher signal-to-noise ratio when tracking targets.

Example 13. The method as in any preceding example, further wherein a target is determined to be a high value target and receives a higher priority focus from a sensor network.

Example 14. The method as in any preceding example, further comprising compact multi-modal representations used as portions of the activity signature.

Example 15. The method as in any preceding example, further comprising tracking interaction of a plurality of activity signatures to determine a goal of a plurality of targets.

Example 16. The method as in any preceding example, further comprising:
- mapping a plurality of sensor signals with separate modalities into a reduced space; and
- selecting modalities in the reduced space that have a best signal to prioritize for target monitoring.

Example 17. The method as in any preceding example, further comprising associating events from separate modalities together to improve recognition of targets.

Example 18. The method as in any preceding example, further comprising a data store of attribute types for the target type that are detectable.

Example 19. The method of any preceding example, further comprising increasing sensor bias for attribute types selected from a data store for the target types.

Example 20. A method for task path generation for a robotic device, comprising:
- receiving a command with a task to be performed by the robotic device;
- mapping the command to a hierarchy of sub-tasks which the robotic device is able to perform;
- identifying a plurality of primitives in a data store;
- converting the hierarchy of sub-tasks to primitives using machine learning;
- joining the primitives together into a plurality of task paths based in part on a relationship defined with the primitives; and
- selecting a task path with a higher efficiency or an average task path with a higher efficiency as compared to the plurality of task paths.

Example 21. The method of any preceding example, wherein converting of the hierarchy of sub-tasks to primitives further comprises selecting primitives using Bayesian program learning.

Example 22. The method of any preceding example, further comprising:
- generating a plurality of task paths using Bayesian program learning; and
- selecting a generated task path which maximizes a gain over a distribution of the task paths.

Example 23. The method of any preceding example, wherein the primitives represent movement primitives sampled from recorded example movements of a robotic device.

Example 24. The method as in any preceding example, further comprising receiving the task that is at least one of: a spoken instruction, a text instruction, a graphical instruction, a video instruction, a tele-operation derived input, a task formed from extracted operations from at least one recording of humans carrying out tasks, a task formed around a range of acceptability around a trajectory from pre-recorded tasks, a task determined from a previous task that was completed or a task triggered by arrival of an object.

Example 25. A method for predicting activity of a target, comprising:
- tracking the target using a sensor device to identify an activity signature;
- sampling the activity signature to obtain a number of sub-portions of the activity signature;
- mapping the sub-portions of the activity signature to activity primitives using Bayesian program learning to form a modeled target activity signature; and
- predicting a next activity primitive by comparing the modeled target activity signature to a data store of template activity signatures, wherein the next activity primitive can be presented as output based in part on similarities of a template activity signature to the modeled target activity signature.

Example 26. The method as in any preceding example, wherein the activity primitives are movement primitives sampled from a data store of recorded sample movements.

Example 27. The method as in any preceding example, further comprising notifying a user of a next activity primitive that is a next movement primitive as a probable next movement of the target.

Example 28. The method as in any preceding example, further comprising scanning for the target using at least one sensor node to validate or invalidate a probable next activity primitive of the target.

Example 29. The method as in any preceding example, wherein a least one sensor node may alter sensors' parameters for sensor nodes to search for the target.

Example 30. The method as in any preceding example, wherein the sensor device queries a sensor grid of other sensor devices to find additional information regarding the target.

Example 31. The method as in any preceding example, wherein context is obtained from at least one of: a spatial map, roads, spatial features or map items used to predict a next movement primitive.

Example 32. The method as in any preceding example, further comprising a data store of attribute types for the target that are detectable.

Example 33. The method of any preceding example, further comprising increasing sensor bias for an attribute type selected from a data store for the target.

Example 34. A method for recognition of a target type using primitive patterns, comprising:
- receiving multi-modal inputs for at least one target that is active, using a sensor node;
- processing the multi-modal inputs of the at least one target using a large language model (LLM); and
- generating a plurality of primitive patterns using the LLM.

Example 35. The method as in any preceding example, further comprising:
- comparing samples of a valued target to primitive patterns, using machine learning, wherein primitive patterns are selected that are similar to sub-samples of a valued target and are joinable together to form an activity signature model; and
- comparing the activity signature model with activity signature templates for targets to determine the target type being captured by the sensor node.

Example 36. The method of any preceding example, wherein the multi-modal inputs are at least one of: an activity signature, instructions, a natural language input, contextual environmental data or images.

Example 37. The method of any preceding example, further generating a task plan for a robot device using the LLM and the multi-modal inputs.

Example 38. The method as in any preceding example, wherein the LLM is executed on the sensor node.

Example 39. The method as in any preceding example, wherein the LLM is executed on the sensor node without using networkable resources.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The term "comprising" is used throughout to mean including at least the recited feature(s) such that any greater number of the same feature and/or additional types of other features are not precluded. It will also be appreciated that specific embodiments have been described herein for purposes of illustration, but that various modifications can be made without deviating from the technology. Further, while advantages associated with some embodiments of the present technology have been described in the context of those embodiments, other embodiments can also exhibit such advantages, and not all embodiments need necessarily exhibit such advantages to fall within the scope of the technology. Accordingly, the disclosure and associated present technology can encompass other embodiments not expressly shown or described herein.

Moreover, unless the word "or" is expressly limited to mean only a single item exclusive from other items in reference to a list of two or more items, then the use of "or" in such a list is to be interpreted as including (a) any single item in the list, (b) all of the items in the list, or (c) any combination of the items in the list. In other words, the use of "or" in this disclosure should be understood to mean non-exclusive "or" (i.e., "and/or") unless otherwise indicated herein.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described present technology.

The invention claimed is:

1. A method for recognition of a target type using primitive patterns, comprising:
   detecting an activity signature of a target that is active, using a sensor node;
   sampling the activity signature of the target to provide sub-samples;
   comparing the sub-samples to primitives from a data store of primitives, using machine learning, wherein primitives are selected that are similar to the sub-samples and are joinable together to form an activity signature model; and
   comparing the activity signature model with activity signature templates for targets to determine the target type being captured by the sensor node.

2. The method as in claim 1, further comprising predicting behavior of a target using activity signature models in case of missing measurements.

3. The method as in claim 1, wherein Bayesian program learning is used to determine whether a primitive matches a sub-sample.

4. The method as in claim 1, wherein the activity signature includes at least one of: a travel path, electronic communication attributes, electromagnetic signals, a state change, or target attributes.

5. The method as in claim 1, wherein the data store of primitives has been extracted from an aggregate grouping of recorded activity signatures for target types.

6. The method as in claim 1, wherein the primitives are motion primitives.

7. The method as in claim 6, wherein the primitives are motion primitives that include target electronic communication attributes which have been detected.

8. The method as in claim 6, wherein the primitives include attributes related to targets.

9. The method as in claim 1, further comprising detecting a plurality of inputs for the activity signature, wherein the plurality of inputs have separate modalities or attributes associated with the target.

10. The method as in claim 9, wherein the separate modalities are at least one of: a camera, electro-optical (EO) sensors, infrared sensors, radar, LiDAR (light detection and ranging) sensors, radio frequency (RF) sensors, acoustic, vibration, or seismic.

11. The method as in claim 9, further comprising:
   processing the plurality of inputs to determine which inputs are more successful at tracking a target type; and
   prioritizing more successful inputs when tracking targets.

12. The method as in claim 9, further comprising:
   processing the plurality of inputs to determine which inputs have a higher signal-to-noise ratio when tracking a target type; and
   prioritizing inputs with a higher signal-to-noise ratio when tracking targets.

13. The method as in claim 1, further wherein a target is determined to be a high value target and receives a higher priority focus from a sensor network.

14. The method as in claim 1, further comprising compact multi-modal representations used as portions of the activity signature.

15. The method as in claim 1, further comprising tracking interaction of a plurality of activity signatures to determine a goal of a plurality of targets.

16. The method as in claim 1, further comprising:
   mapping a plurality of sensor signals with separate modalities into a reduced space; and
   selecting modalities in the reduced space that have a best signal to prioritize for target monitoring.

17. The method as in claim 1, further comprising associating events from separate modalities together to improve recognition of targets.

18. The method as in claim 1, further comprising a data store of attribute types for the target type that are detectable.

19. The method of claim 18, further comprising increasing sensor bias for attribute types selected from a data store for the target types.

20. A method for task path generation for a robotic device, comprising:
   receiving a command with a task to be performed by the robotic device;
   mapping the command to a hierarchy of sub-tasks which the robotic device is able to perform;
   identifying a plurality of primitives in a data store;
   converting the hierarchy of sub-tasks to primitives using machine learning;
   joining the primitives together into a plurality of task paths based in part on a relationship defined with the primitives; and
   selecting a task path with a higher efficiency or an average task path with a higher efficiency as compared to the plurality of task paths.

21. The method of claim 20, wherein converting of the hierarchy of sub-tasks to primitives further comprises selecting primitives using Bayesian program learning.

22. The method of claim 20, further comprising:
   generating a plurality of task paths using Bayesian program learning; and
   selecting a generated task path which maximizes a gain over a distribution of the task paths.

23. The method of claim 20, wherein the primitives represent movement primitives sampled from recorded example movements of a robotic device.

24. The method as in claim 20, further comprising receiving the task that is at least one of: a spoken instruction, a text instruction, a graphical instruction, a video instruction, a tele-operation derived input, a task formed from extracted operations from at least one recording of humans carrying out tasks, a task formed around a range of acceptability around a trajectory from pre-recorded tasks, a task determined from a previous task that was completed or a task triggered by arrival of an object.

25. A method for predicting activity of a target, comprising:
   tracking the target using a sensor device to identify an activity signature;

sampling the activity signature to obtain a number of sub-portions of the activity signature;

mapping the sub-portions of the activity signature to activity primitives using Bayesian program learning to form a modeled target activity signature; and predicting a next activity primitive by comparing the modeled target activity signature to a data store of template activity signatures, wherein the next activity primitive can be presented as output based in part on similarities of a template activity signature to the modeled target activity signature.

26. The method as in claim 25, wherein the activity primitives are movement primitives sampled from a data store of recorded sample movements.

27. The method as in claim 25, further comprising notifying a user of a next activity primitive that is a next movement primitive as a probable next movement of the target.

28. The method as in claim 25, further comprising scanning for the target using at least one sensor node to validate or invalidate a probable next activity primitive of the target.

29. The method as in claim 25, wherein a least one sensor node may alter sensors' parameters for sensor nodes to search for the target.

30. The method as in claim 25, wherein the sensor device queries a sensor grid of other sensor devices to find additional information regarding the target.

31. The method as in claim 25, wherein context is obtained from at least one of: a spatial map, roads, spatial features or map items used to predict a next movement primitive.

32. The method as in claim 25, further comprising a data store of attribute types for the target that are detectable.

33. The method of claim 32, further comprising increasing sensor bias for an attribute type selected from a data store for the target.

34. A method for recognition of a target type using primitive patterns, comprising:

receiving multi-modal inputs for at least one target that is active, using a sensor node;

processing the multi-modal inputs of the at least one target using a large language model (LLM);

generating a plurality of primitive patterns using the LLM;

comparing samples of a valued target to one or more primitive patterns of the plurality of primitive patterns, using machine learning, wherein the one or more primitive patterns are selected that are similar to sub-samples of a valued target and are joinable together to form an activity signature model; and comparing the activity signature model with at least one activity signature template for targets to determine the target type being captured by the sensor node.

35. The method as in claim 34, wherein the LLM is executed on the sensor node without using networkable resources.

36. The method of claim 34, wherein the multi-modal inputs are at least one of: an activity signature, instructions, a natural language input, contextual environmental data or images.

37. The method of claim 34, further generating a task plan for a robot device using the LLM and the multi-modal inputs.

38. The method as in claim 34, wherein the LLM is executed on the sensor node.

* * * * *